Feb. 24, 1931.   L. AMBROSIUS   1,793,578
STRAINER
Filed March 19, 1930

Inventor
Louis Ambrosius
By Clarence A. O'Brien
Attorney

Patented Feb. 24, 1931

1,793,578

UNITED STATES PATENT OFFICE

LOUIS AMBROSIUS, OF WEST DE PERE, WISCONSIN

STRAINER

Application filed March 19, 1930. Serial No. 437,208.

This invention relates to an improved strainer, is especially, but not necessarily, adapted for straining milk.

My principal aim is to generally improve upon dairy appliances of this class by providing a strainer which is characterized by a novel sediment collecting cup at its bottom, together with companion elements forming an assembly of reticular strainers for effectively straining the milk.

In carrying the invention into practice, I have found it expedient and practical, as well as advantageous, to utilize an arrangement of straining elements such as are removably fitted in place to facilitate cleaning and promote sanitation.

Figure 1:
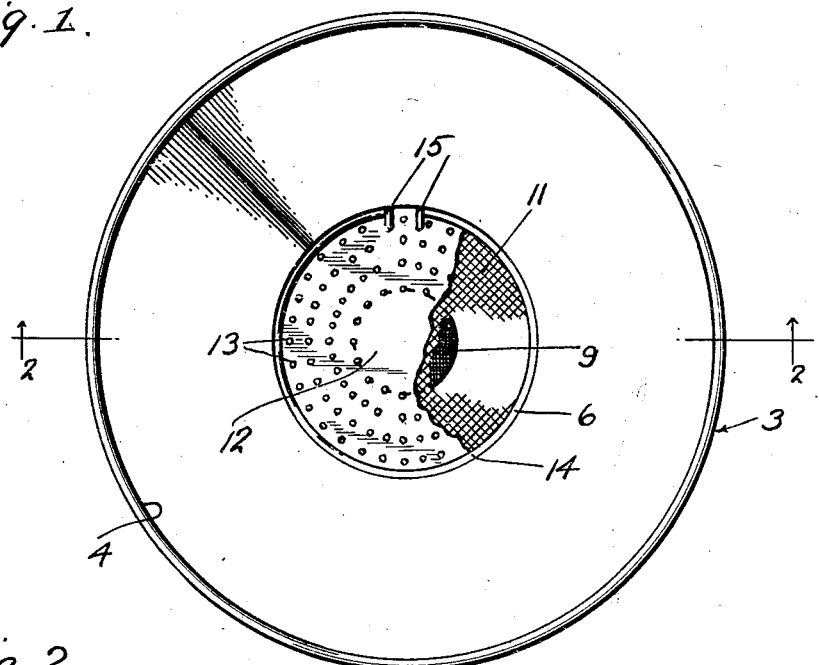
Figure 1 is a top plan view with portions broken away and shown in elevation to disclose the superposed arrangement of screens.
Figure 2:
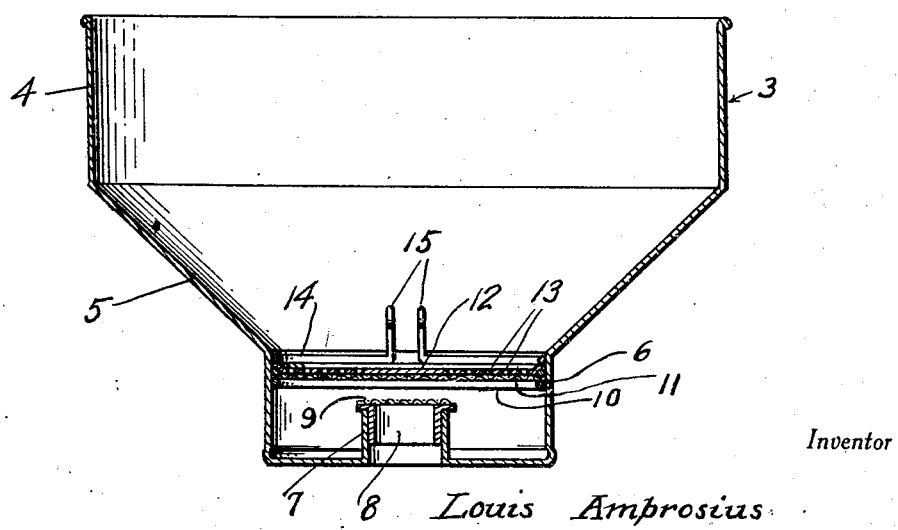
Figure 2 is a central vertical section on the line 2—2 of Figure 1.

In the drawings; the body of the strainer is generally designated by the reference character 3 and it is of customary configuration in that it includes an annular rim 4 at its top and a frusto conical funnel-shaped portion 5. The apex part of this portion 5 is formed into a sediment collecting cup 6. This cup has a central upstanding neck 7 which constitutes the discharge opening.

A removable strainer is fitted in this neck and comprises a nipple 8 fitted telescopically in the neck and carrying a relatively fine screen 9. The numeral 10 designates a fixedly mounted annulus forming a seat for a coarser screen 11 having a ring-like periphery seated on the annulus 10. Supported on this screen 11 is a metal disc having an imperforate central portion 12 of a diameter approximately equal to the screen 9. Formed around this are the perforations 13 to permit initial passage of milk.

The screen 11 and disc 12 are arranged in superposed relation and are held in position by a retaining clamp. This clamp comprises a split resilient expanding ring 14 having upstanding finger grips 15 to facilitate application and removal. By removing the clamp 14, the disc 12 and the screen 11, the fine screen 9 will be rendered accessible for removing and cleansing. Also this arrangement expedites removal of the sediment which collects in the cup 6 during the straining operation.

From the foregoing description and drawings, it will be seen that the novelty is predicated upon the provision of the sediment collecting cup 6 characterized by the central discharge neck 7 having a removable nipple equipped with a fine straining screen 9. These details, together with the superposed arrangement of the main or coarse screen 11, the perforated disc 12 and the retaining device 14 are the mechanical distinctions and features of the invention.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

In a milk strainer of the class described, a body including a rim, a funnel-shaped intermediate portion, and a reduced sediment collecting cup, said cup having a central discharge opening and an upwardly projecting internal neck, a nipple fitted into said neck, a comparatively fine screen carried by said nipple, and superposed straining elements arranged in said cup above said screen, and consisting of a circular coarse screen, a perforated plate having an imperforate central portion, a supporting ring for said screen and plate, and a removable retaining clamp snapped into said cup for holding the coarse screen and plate in position.

In testimony whereof I affix my signature.

LOUIS AMBROSIUS.